United States Patent
Song

(10) Patent No.: US 10,349,008 B2
(45) Date of Patent: Jul. 9, 2019

(54) TOOL OF MOBILE TERMINAL AND INTELLIGENT AUDIO-VIDEO INTEGRATION SERVER

(71) Applicant: AINEMO INC, Beijing (CN)

(72) Inventor: Chenfeng Song, Las Vegas, NV (US)

(73) Assignee: AINEMO INC., Beijing (CN)

( * ) Notice: Subject to any disclaimer, the term of this patent is extended or adjusted under 35 U.S.C. 154(b) by 0 days.

(21) Appl. No.: 15/326,248

(22) PCT Filed: Sep. 15, 2014

(86) PCT No.: PCT/CN2014/086576
§ 371 (c)(1),
(2) Date: Nov. 17, 2017

(87) PCT Pub. No.: WO2016/008209
PCT Pub. Date: Jan. 21, 2016

(65) Prior Publication Data
US 2018/0176507 A1    Jun. 21, 2018

(30) Foreign Application Priority Data

Jul. 15, 2014 (CN) .......................... 2014 1 0337180

(51) Int. Cl.
*H04N 7/14* (2006.01)
*H04N 7/15* (2006.01)

(52) U.S. Cl.
CPC ............. *H04N 7/147* (2013.01); *H04N 7/15* (2013.01); *H04N 7/152* (2013.01); *H04N 2007/145* (2013.01)

(58) Field of Classification Search
CPC ... G01S 5/0072; G06F 17/3028; H04L 12/18; H04L 63/102; H04L 63/105;
(Continued)

(56) References Cited

U.S. PATENT DOCUMENTS 7,453,829 B2 * 11/2008 Pasha ................ H04L 29/06027
370/261
2005/0015444 A1 * 1/2005 Rambo .................... H04N 7/15
709/204
(Continued)

FOREIGN PATENT DOCUMENTS

| CN | 101534413 A | 9/2009 |
|---|---|---|
| CN | 101867769 A | 10/2010 |
| CN | 102892032 A | 1/2013 |
| WO | 2006119576 A1 | 11/2006 |

OTHER PUBLICATIONS

English-language abstract of Chinese Patent Application No. CN 101867769 A.
(Continued)

*Primary Examiner* — Khai N. Nguyen
(74) *Attorney, Agent, or Firm* — Bayes PLLC

(57) ABSTRACT

Disclosed are a tool installed on a mobile terminal and an intelligent real-time audio-video integration server. The tool installed on the mobile terminal comprises: a transmitter unit configured to respond to a first trigger and to transmit a request for a video integrating real-time videos captured by multiple communication terminals; and, a receiver unit configured to receive the video integrating the real-time videos captured by the multiple communication terminals. The transmitter unit transmits, on the basis of a first communication terminal set in the multiple communication terminals and corresponding to a video displayed on a monitor of a mobile terminal, a request for an audio integrating real-time audios captured by the communication terminals in the first communication terminal set; the receiver unit receives the audio integrating the real-time audios captured by the communication terminals in the first communication terminal set. The present invention, in cases that a monitored scene goes beyond the field of view of one (Continued)

camera, allows a monitoring person to view the entire monitored scene instead of a part of the monitored scene.

8 Claims, 8 Drawing Sheets

(58) Field of Classification Search
CPC ............... H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/23206; H04W 4/18; H04W 4/185
USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/566; 704/270
See application file for complete search history.

(56) References Cited

U.S. PATENT DOCUMENTS

| | | | |
|---|---|---|---|
| 2005/0094578 A1* | 5/2005 | Pasha ................ | H04L 29/06027 370/260 |
| 2009/0204906 A1* | 8/2009 | Irving ...................... | H04N 7/15 715/753 |
| 2009/0207310 A1* | 8/2009 | Arai ......................... | G06T 3/40 348/581 |
| 2011/0088068 A1* | 4/2011 | Patnoe .................. | H04L 65/608 725/61 |
| 2013/0232419 A1* | 9/2013 | Yates .................... | G06F 3/0484 715/723 |
| 2018/0176507 A1* | 6/2018 | Song ........................ | H04N 7/15 |

OTHER PUBLICATIONS

English-language abstract of Chinese Patent Application No. CN 102892032 A.

First Office action issued in parallel Chinese Application No. 2014103371802, dated Nov. 30, 2016, 8 pages.

\* cited by examiner

TOOL OF MOBILE TERMINAL AND INTELLIGENT AUDIO-VIDEO INTEGRATION SERVER This application claims the benefit of a Chinese patent application No. 201410337180.2 filed on Jul. 15, 2014, with the title "TOOL OF MOBILE TERMINAL AND INTELLIGENT AUDIO-VIDEO INTEGRATION SERVER," the entire content of which is incorporated herein by reference.

TECHNICAL FIELD

The present invention relates to communication and image processing technologies, and in particular, to a mobile terminal tool and a server that intelligently integrates audio and video.

BACKGROUND

In the prior art, for example, in an environment such as a long table conference, the conference scene is long and exceeds the photographing range of one camera. Therefore, in an application using a remote camera or the like for remote two-way video calling using a video terminal, the person monitoring or calling can only view part of the conference scene from the video captured by the one camera.

SUMMARY

One of the technical problems solved by the present invention is to enable the monitored person to see the entire monitored scene, not a part of the monitored scene, if the monitored scene exceeds the shooting range of one camera.

According to an embodiment of the present invention, there is provided A tool mounted on a mobile terminal, comprising: a transmitting unit configured to send a request for an integrated video of real-time video collected by a plurality of communication terminals in response to a first trigger, wherein the plurality of communication terminals respectively collect real-time video of a part of a specific scene, the real-time videos respectively collected by the plurality of communication terminals integrate to form the real-time video of the specific scene; a receiving unit configured to receive integrated video of real-time video collected by the plurality of communication terminals, wherein based on a video displayed on a display of the mobile terminal, a first one of the plurality of communication terminals, the transmitting unit sends a request for integrated audio of the real-time audio collected by the communication terminal in the first communication terminal set, the receiving unit receives the integrated audio of the real-time audio collected by the communication terminal in the first communication terminal set, wherein the video displayed on the display of the mobile terminal is part of an integrated video of real-time video acquired by the plurality of communication terminals.

Optionally, the tool further comprising: a configuration unit for receiving a configuration of user's integration of video and audio acquired by the plurality of communication terminals.

Optionally, the transmitting unit further initiates a connection request to the communication terminal in the first communication terminal set, and in response to the communication terminal in the first communication terminal set, a two-way communication is established with the communication terminal in the first communication terminal set.

Optionally, the tool further comprising: a zooming unit configured to scale the video displayed on the display of the mobile terminal in response to a user zoom operation on the video displayed on the display of the mobile terminal, such that the first communication terminal set corresponding to the video displayed on the display changes.

Optionally, the tool further comprising: a sliding unit configured to respond to a user's slide operation of a video displayed on a display of the mobile terminal, sliding the video displayed on the display of the mobile terminal, so that the first communication terminal set corresponding to the video displayed on the display changes.

Optionally, the first trigger comprises any one of: powering on the mobile terminal; activating the tool when the mobile terminal is powered on; a specific action on the user interface when the mobile terminal is powered on; a specific voice received in the power-on state of the mobile terminal; the light sensed by the mobile terminal becomes stronger.

Optionally, the transmitting unit, in response to receiving a selection for a specific person of the specific scenes, sending a request for integrated video and audio of real-time video and audio related to the specific person in real-time video and audio collected by the plurality of communication terminals, the receiving unit receives integrated video and audio related to real-time video and audio of the specific person in the real-time video and audio collected by the plurality of communication terminals.

Optionally, the transmitting unit initiates a connection request to a communication terminal that has acquired real-time video and audio relating to the specific person in response to receiving a selection for a specific person in the specific scene; and establishing a two-way communication with a communication terminal having acquired real-time video and audio relating to the specific person in response to an automatic reply collected from the communication terminal concerning real-time video and audio of the specific person.

Optionally, the selection for a specific person of the specific scenes is clicking on a specific person or calling the name of a specific person in the video displayed on the display of the mobile terminal.

According to an embodiment of the present invention, there is also provided a server that intelligently integrates real-time audio and video, comprising: a video and audio receiving means configured to receive real-time video and audio from a plurality of communication terminals, a request from the mobile terminal for an integrated video of real-time video acquired by the plurality of communication terminals, and a request from the mobile terminal for the integrated audio of real-time audio collected by the communication terminal in the first communication terminal set of the plurality of communication terminals; a video and audio integration means configured to respond to requests from the mobile terminal for the integrated video of the live video acquired by the plurality of communication terminals, integrating real-time video collected by the plurality of communication terminals; and in response to a request from the mobile terminal for the integrated audio of the real-time audio collected by the communication terminal in the first communication terminal set of the plurality of communication terminals, integrating the real-time audio collected by the communication terminal in the first communication terminal set among the multiple communication terminals; a video and audio transmitting means configured to send the integrated video or/and the integrated audio to the mobile terminal.

Optionally, the server further comprising: a communication establishment unit configured to forward the connection request to the communication terminal in the first communication terminal set, in response to receiving a connection request from the mobile terminal to the communication terminal in the first communication terminal set, and establishing bidirectional communication between the mobile terminal and the communication terminal in the first communication terminal set, in response to an automatic reply by the communication terminal in the first communication terminal set.

Optionally, the video and audio integration means comprises: a video image comparison module configured to compare in real time the real-time videos collected by the plurality of communication terminals and determine the overlap between the real-time videos collected by the plurality of communication terminals; an overlapping part elimination module configured to eliminate overlapping parts of the real-time videos collected by the plurality of communication terminals so as to integrate the real-time videos collected by the plurality of communication terminals.

Optionally, the server further comprising: identification means, in response to receiving a request for integrated video and audio related to real-time video and audio of the specific person in real-time video and audio collected from the mobile terminal for the plurality of communication terminals, identifying real-time video and audio related to the specific person in real-time video and audio collected by the plurality of communication terminals, and the video/audio integration means integrates the real-time video and audio related to the specific person, the video and audio transmitting means transmits the integrated real-time video and audio relating to the specific person to the mobile terminal.

Optionally, the server further comprising: identification means, in response to receiving a connection request from the mobile terminal to the communication terminal acquiring the real-time video and audio relating to the specific person, identifying real-time video and audio related to the specific person in real-time video and audio collected by the plurality of communication terminals, thereby identifying a communication terminal that has acquired real-time video and audio relating to the specific person, and the communication establishment unit forwards a connection request to a communication terminal that has acquired real-time video and audio relating to the specific person, and in response to the automatic answering of the communication terminal collecting the real-time video and audio relating to the specific person, establishing bidirectional communication is between a mobile terminal and a communication terminal that has acquired real-time video and audio relating to the specific person.

In one embodiment of the present invention, a plurality of communication terminals respectively acquire real-time video of a part of a specific scene, the real-time videos respectively collected by the plurality of communication terminals are integrated to form a real-time video of the specific scene, and in this way, after the mobile terminal sends the request for the integrated video, the integrated video can be displayed on the mobile terminal to enable the monitoring person to see the entire monitored scene when the monitored scene exceeds the shooting range of one camera effect.

In addition, since the monitored scene is long and narrow, for example, the monitoring user may monitor a part of the scene at some time, that is, the video of this part of the scene is seen and the audio of this part of the scene is heard. Therefore, the embodiment of the present invention may, basing on the first communication terminal set among the multiple communication terminals corresponding to the video displayed on the display of the mobile terminal, sends a request for integrated audio of real-time audio collected by a communication terminal in the first set of communication terminals, and only receive the integrated audio of the real-time audio collected by the communication terminal in the first communication terminal set. In this way, when the mobile terminal receives the integrated video from the real-time videos collected by the multiple communication terminals, the mobile terminal automatically knows which part of the integrated video corresponds to the video displayed by the display according to the size of the display and the size of the video image currently displayable on the display, and its corresponding first communication terminal set, and acquire the integrated audio of the real-time audio collected by the communication terminal in the first communication terminal set. That is, the present embodiment ensures that the video displayed on the display corresponds to the audio heard by the user. The beneficial effect of effectively avoiding the interference caused by the reception of all the audio due to the interference of the other part of the audio on the part of the video displayed on the display is achieved. Once the audio and video do not correspond, the monitoring users will be difficult to distinguish whether the sound comes from the currently displayed screen, causing confusion. It is possible to speak only to the person in the display screen while suppressing the audio collected by other communication terminals, instead of listening to all the person in the whole scene. At present, it is a pioneering work of monitoring system, especially conference monitoring system.

Since the tool of one embodiment of the present invention further includes a configuration unit configured to receive the user's configuration for integrating video and audio captured by the plurality of communication terminals, that is, the plurality of communication terminals is specified by the user to be bound to the user's mobile terminal. In this way, next time in response to the first trigger, it is possible to know which mobile terminals requested the integrated video. In this way, it is possible for the user to designate a plurality of communication terminals to which the user who is bound to his mobile terminal wishes to integrate his video and audio. It achieves the beneficial effect that the user can flexibly designate the terminal that is bound to the terminal and integrate the AV terminal according to the requirement.

Since the tool installed in the mobile terminal provided in one embodiment of the present invention may initiate a connection request to the communication terminal in the first communication terminal set, and establishes two-way communication with the communication terminal in the first communication terminal set in response to the automatic answering of the communication terminal in the first communication terminal set. In this way, this embodiment may automatically initiate a connection request to the communication terminal in the set according to the identified specific communication terminal set, thereby establishing communication with the identified communication terminal, achieving the benefits that a monitoring user who sees a person on the display will be able to conduct an unobstructed, two-way communication with that person, analogously to the telephone communication with that person. This is not what the current conference monitoring system can do. This is a pioneering work in monitoring systems. In addition, the communication terminal in the first communication terminal set automatically answers. This ensures that, for example, person who are watching the conference scene cannot sense the switch, achieving seamless meeting monitoring, so that the smoothness of meetings and calls are not interrupted.

Since the tool installed in the mobile terminal provided by one embodiment of the present invention may further include a zooming unit and/or a sliding unit, the first communication terminal set corresponding to the video displayed on the display is changed by responding to the user's zooming operation and/or the sliding operation. According to this embodiment, the user can arbitrarily scale and move the video picture according to the need of watching the video. In this way, if the monitoring user wants to talk to another person in the monitored scene, the video screen is slid so that the screen displayed on the display becomes a screen containing that person. If there are multiple person on the screen of the current monitor, the monitoring user only wants to talk to one person. Users can zoom the display of the display to the view only containing that person. In this way, the purpose of monitoring the user's freedom to speak to anyone in the monitored scene is achieved. This is also a pioneering work in monitoring systems.

Since a tool installed in a mobile terminal provided by one embodiment of the present invention may respond to receiving a selection for a specific person in the specific scene, sending a request for integrated video and audio of real-time video and audio related to the specific person in real-time video and audio collected by the plurality of communication terminals, and receiving integrated video and audio related to real-time video and audio of the specific person in real-time video and audio collected by the plurality of communication terminals. Thus, making it very clear to the user of the mobile terminal when to talk in real time with one person in a specific scene, by simply typing in or entering the names of those person, the user can quickly lock in and see the integrated video and audio in which the person is involved, without having to rescale or slide the display on the monitor, which effectively save the time and effort of manual screening. This is also a pioneering work in monitoring systems.

Since a tool installed in a mobile terminal provided by one embodiment of the present invention may respond to receiving a selection for a specific person in the specific scene, a connection request is initiated to a communication terminal that has acquired real-time video and audio relating to the specific person, and establishes two-way communication with a communication terminal that has acquired real-time video and audio relating to the specific person in response to an automatic reply collected from the communication terminal concerning real-time video and audio of the specific person. Thus, it is very clear to the user of the mobile terminal when to talk in real time with one person in a specific scene, by simply typing in or entering the names of the person, the user can quickly lock without further resizing or sliding the display on the monitor and further establish direct two-way communication with the communication terminals of the person, which effectively save the time and effort of manual screening. This is also a pioneering work in the conference monitoring systems.

According to one embodiment of the invention, the selection for a specific person of the specific scenes is to click on the person or speak a specific person's name in the video displayed on the display of the mobile terminal. In this way, the user can easily select a specific person appearing in a specific scene by speaking or manually operating, and may further trigger a request to send integrated video and audio related to real-time video and audio of the specific person in real-time video and audio collected over multiple communication terminals, or further trigger a connection request to a communication terminal that has acquired real-time video and audio relating to the specific person. That is, according to an embodiment of the present invention, automatic completion of a series of subsequent steps may be triggered in response to the user's speaking or manual selection. For users, this simple trigger saves a lot of time and effort.

According to one embodiment according to another aspect of the present invention, there is provided a server that intelligently integrates real-time audio and video, which can integrate video and audio shot by multiple communication terminals according to a request for integrating corresponding video and audio from a mobile terminal and send the integrated video and audio to the mobile terminal. This allows the monitoring person to see the entire monitored scene, rather than being part of the monitored scene, if the monitored scene exceeds the camera's shooting range.

In one embodiment of the present invention, the server may integrate audio collected by a part of communication terminals in all the plurality of communication terminals and send the integrated audio to the mobile terminal according to the request of the mobile terminal. It is also possible to integrate the audio collected by all the multiple communication terminals. In any case, the server provided in this embodiment may adaptively adjust the audio returned to the mobile terminal according to the specific request of the mobile terminal, thereby enabling the user of the mobile terminal to receive a specific portion of the integrated audio from the server with great flexibility. For example, when only a portion of the monitored scene is displayed on the display of a segment of terminal, the audio corresponding to this portion of the scene may be sent to only the user of the mobile terminal. In this way, the video and audio seen by the monitoring user correspond to each other and are not disturbed by other parts of the audio.

Since the server provided according to one embodiment of the present invention may also respond to receiving a connection request from the mobile terminal to the communication terminal in the first communication terminal set, forwarding the connection request to the communication terminal in the first communication terminal set, and establishing bidirectional communication between the mobile terminal and the communication terminal in the first communication terminal set in response to the automatic answer of the communication terminal in the first communication terminal set. As a result, the server can automatically establish a connection between the mobile terminal and a specific communication terminal on the display screen of the display, and achieve the effect of enabling two-way communication with the displayed persons.

Since the server provided according to one embodiment of the present invention can also compare the real-time video collected by multiple communication terminals in real time and eliminate the overlap between the real-time videos, it makes the processed video looked like a single integrated view. For example, in a large conference venue, multiple communication terminals are placed for all the perspectives of the entire conference venue. Each communication terminal separately collects a part of real-time audio and video of the meeting place. Since the audio and video collecting lens of the communication terminal is usually wide-angle, the video images collected by the adjacent or adjacent communication terminals inevitably have overlapping pictures. In this embodiment, video images are compared and their overlapping portions are eliminated. So that the video images collected by multiple communication terminals are finally integrated to form a whole and complete video picture. Finally, the overall picture presented to the user so that the user does not feel is collected by a plurality of communication terminals. Instead, it feels like a single shot of an independent camera with a very long, wide shot completes. The overall sense of the screen is strong.

Since the server provided according to one embodiment of the present invention can respond to receiving a request for integrated video and audio related to real-time video and audio of the specific person in real-time video and audio collected from the mobile terminal for the plurality of communication terminals, Identifying real-time video and audio related to the specific person in real-time video and audio collected by the plurality of communication terminals, and integrating the real-time video and audio related to a specific person, and sending the integrated real-time video and audio related to the specific person to the mobile terminal, so that the user beside the mobile terminal knows very well which person in a specific scene needs to talk in real time. By only sending requests for the video and audio of these persons does not need to further browse the entire monitored scene and select, the user can quickly lock and view the integrated audio and video involving these person, saving time and effort on manual filtering.

Since the server provided by one embodiment of the present invention may further include an identification means, in response to receiving a connection request from a mobile terminal to a communication terminal that acquires real-time video and audio related to the specific person, identifying real-time video and audio related to the specific person in real-time video and audio collected by the plurality of communication terminals, thereby identifying a communication terminal that captures real-time video and audio relating to the specific person, and the communication establishing unit forwards the connection request to the communication terminal that has acquired the real-time AV audio relating to the specific person, and responding to the automatic answering of the communication terminal collecting the real-time video and audio related to the specific person, bidirectional communication is established between a mobile terminal and a communication terminal that acquires real-time video and audio related to the specific person. Thus, it is very clear to the user of the mobile terminal, when he needs to talk in real time with one person in a specific scene, only the connection request to the communication terminals associated with these persons is transmitted so as to establish the connection with the communication terminals associated with the persons. The user can quickly establish direct communication with one person in need, effectively saving the time and effort of manual filtering.

It will be understood by those of ordinary skill in the art that although the following detailed description refers to the illustrated embodiments, the accompanying drawings, the present invention is not limited to these embodiments. Rather, the scope of the invention into be broadly extended, and it is intended that the scope of the invention be defined solely by the appended claims.

BRIEF DESCRIPTION OF THE DRAWINGS

Other features, objects, and advantages of the invention will become more apparent upon reading the detailed description of the non-limiting embodiments, taken with reference to the following drawings, in which.

The same or similar reference numbers in the drawings represent the same or similar components.

DETAILED DESCRIPTION

The present invention is further described in detail below with reference to the accompanying drawings.

Figure 1:
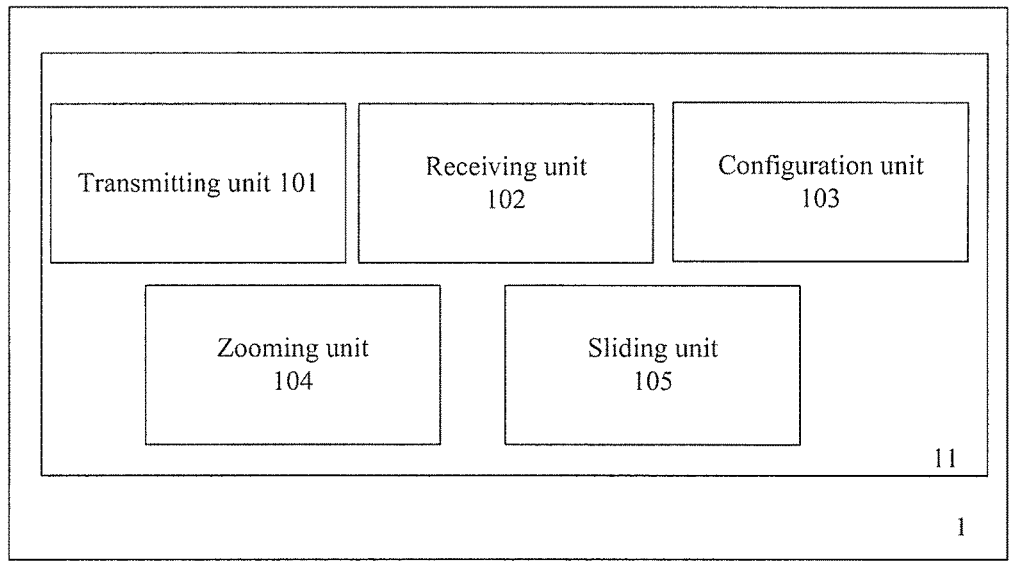
FIG. 1 shows a schematic block diagram of a tool 11 mounted on a mobile terminal 1 according to one embodiment of the present invention.

FIG. 1 shows a schematic block diagram of a tool 11 mounted on a mobile terminal 1 according to one embodiment of the present invention. According to FIG. 1, the tool 11 mounted on the mobile terminal 1 includes:

a transmitting unit 101 is configured to send a request for an integrated video of the real-time video collected by the plurality of communication terminals 2 in response to a first trigger, wherein the plurality of communication terminals 2 respectively collect real-time videos of a part of a specific scene, the real-time videos collected respectively by the plurality of communication terminals 2 are combined to form a real-time video of the specific scene;

a receiving unit 102 configured to receive the integrated video of the real-time video collected by the multiple communication terminals 2;

wherein the transmitting unit 101 sets the first one of the plurality of communication terminals 2 corresponding to the video displayed on the display of the mobile terminal 1, sends a request for integrated audio of the real-time audio collected by the communication terminal 2 in the first communication terminal set. The receiving unit 102 receives the integrated audio of the real-time audio collected by the communication terminal 2 in the first communication terminal set, wherein the video displayed on the display of the mobile terminal 1 is part of an integrated video of the live video acquired by the plurality of communication terminals 2.

It should be noted that the above video and audio integration includes but is not limited to the de-duplication and splicing of multiple video pictures, the de-duplication and noise reduction of multiple audio, and the like. There are various techniques for integrating images in the prior art. For example, the patent application entitled "201410117927.3" and entitled "A Method and System for Processing Multi-Channel Video Monitoring Image Data" discloses a method of splicing multiple images into one image.

In the above, the tool 11 installed on the mobile terminal 1 is installed on the mobile terminal, such as an app, and displayed in the form of a corresponding application icon or the app is embedded in a chip of the mobile terminal, the tool 11 mounted on the mobile terminal 1, is embodied as the chip.

The first trigger refers to an action that causes the transmitting unit to send a request for an integrated video of the real-time video collected by the plurality of communication terminals 2. For example, it may include any one of the following: powering on of the mobile terminal; activation of the tool in a startup state of the mobile terminal; specific action of a user interface in a startup state of the mobile terminal; and the light sensed at mobile terminal becomes stronger. Among them, if the power-on act as a trigger, user may receive the integrated video when the mobile terminal is powered-on, users do not have to activate the tool to avoid complex operations. Activation of the tool in the powered-on state of the mobile terminal as a trigger has the advantage that the user can decide again whether to receive the integrated video after powering on, which avoids automatic activation after power-on but not required by the user. The first trigger may also be performed by a specific action on the user interface such as a click, double clicks, a long press, and the like on the user interface when the mobile terminal is powered on. The benefit of this is that users can decide once again whether to receive the integrated video after powering on, avoiding automatic activation after powered on but not required by the user. In addition, the first trigger may also be performed by the light intensity sensed in the power-on state of the mobile terminal. In this way, for example, the beneficial effect of automatically triggering when the user pulls out the mobile terminal from the pocket so that the light sensed by the mobile terminal becomes stronger. It is not triggered by power on. Because even when powered on, as the mobile terminal in the user's pocket users also may not need integrated video and audio. If the user pulls out the mobile terminal from his pocket. It automatically turns on the integrated video and audio capabilities, which avoid the user to turn on the integration of complex operations.

The first trigger may also be other manners, where the triggering manner of the tool is not limited.

The mobile terminal 1 includes, but is not limited to, any communication device that can perform human-computer interaction with a user, which is not limited herein. The communication terminal 2 includes, but is not limited to, any electronic product, such as a computer, a tablet computer (PAD) or the like, capable of performing human-computer interaction with a user through a touchpad, a remote control device, a voice control device or a keyboard. Those skilled in the art should It is to be understood that other devices that are suitable for use in the present invention should also be included within the protection scope of the present invention.

Here, the communication terminal 2 may perform real-time video collection by any device having a video capture function, such as a camera, and the communication terminal 2 may perform real-time audio collection by any device having an audio capture function, such as a recording unit. The communication terminal 2 may upload the real-time video and audio captured in real time to the corresponding server based on such as Transmission Control Protocol (TCP) or User Datagram Protocol (UDP), etc. The video and audio uploaded by the plurality of communication terminals 2 are uniformly integrated and processed by the server.

Figure 2:
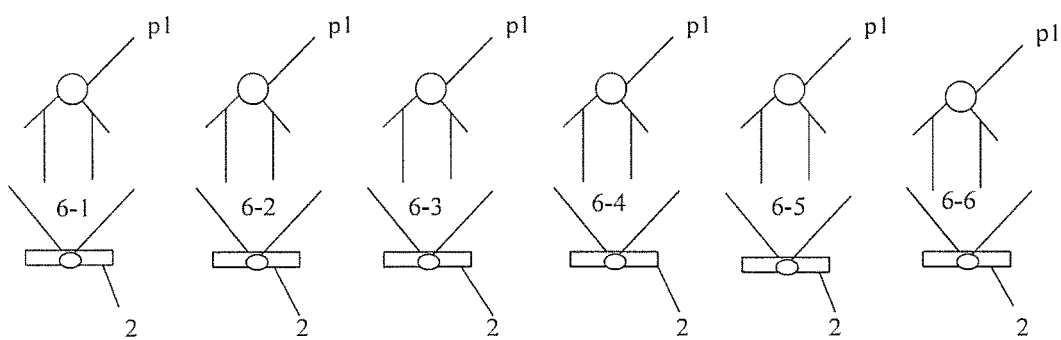
FIG. 2 shows a schematic diagram of real-time video and audio capture performed by multiple communication terminals according to a preferred embodiment of the present invention.

In practice, the plurality of communication terminals 2 are usually located in a specific scene, and each communication terminal 2 is usually responsible for acquiring a part of real-time video of a specific scene. When each communication terminal 2 uploads the collected video and audio information of each part to the corresponding server in real time, the server integrates the video and audio to obtain a complete real-time video and audio of the specific scene. Of course, the server may integrate video and audio uploaded by some of the plurality of communication terminals 2, or may integrate video and audio uploaded by all the plurality of communication terminals. Typically, please refer to FIG. 2, which shows a schematic diagram of real-time video and audio capture performed by multiple communication terminals according to an embodiment of the present invention. As shown in FIG. 2, six communication terminals 2 are placed in a long-type place, and each communication terminal 2 is responsible for collecting video and audio information (determined by the corresponding field of view) of a certain area of the party. The audio and video commonly acquired by the communication terminals 2 adjacent or close to each other may cross or overlap. For example, the two adjacent communication terminals 2 capture the same person at the same time, or simultaneously capture a plurality of person's speech. The server performs integration processing on a plurality of videos uploaded by two adjacent communication terminals 2 and containing the same person or a plurality of person who simultaneously capture a plurality of person's speeches. In this integrated video picture, only the whole picture of the person after integration is included, instead of including two separate pictures of the person having picture overlapping parts. In the integrated audio, only one piece of audio after the integration of the captured multiple person is included, instead of the superimposed audio containing two or more overlapping pieces of independent audio of the captured multiple person. In FIG. 2, six communication terminals 2 respectively capture video and audio of six persons p1-p6, and each communication terminal captures one's audio and video.

A specific scene may be a large conference venue, a banquet venue, or the like, and may also be other places that require multiple communication terminals to perform real-time video and audio capture in the field.

Figure 3:
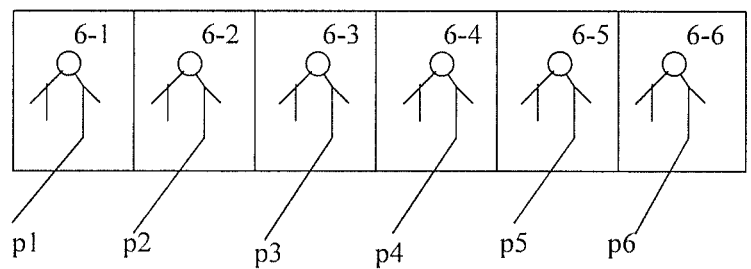
FIG. 3(a) shows a video shot by six server terminals integrated by the server according to one embodiment of the present invention.
FIG. 3(b) shows the initial screen displayed on the display of the mobile terminal after the tool 11 installed on the mobile terminal 1 is activated according to one embodiment of the present invention.
FIG. 3(c) shows the result after scaling the picture displayed on the display in FIG. 3(b) according to one embodiment of the present invention.
FIG. 3(d) shows the result of sliding the picture displayed on the display of FIG. 3(b) according to one embodiment of the present invention.
FIG. 3(e) shows a scenario in which a video of a specific person after integration is displayed on a display when a user selects a specific person according to one embodiment of the present invention.
Figure 3:
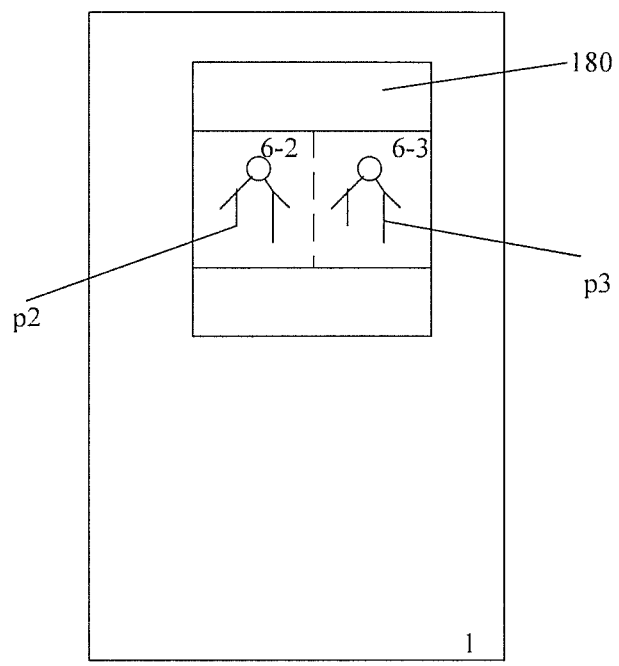
Figure 3:
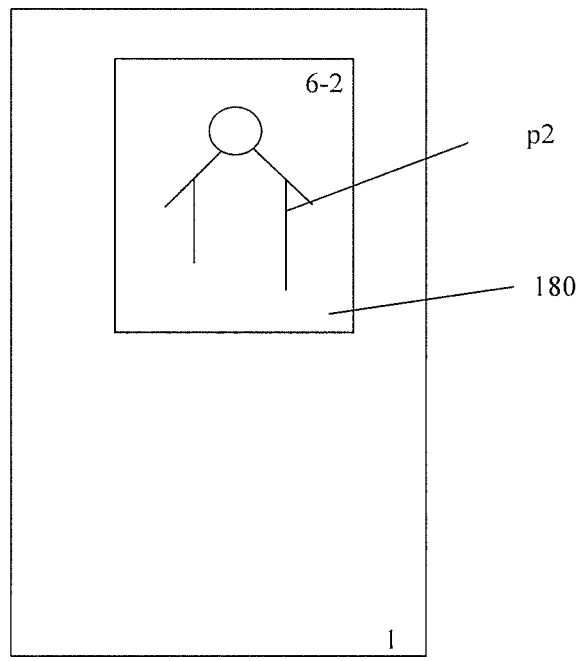
Figure 3:
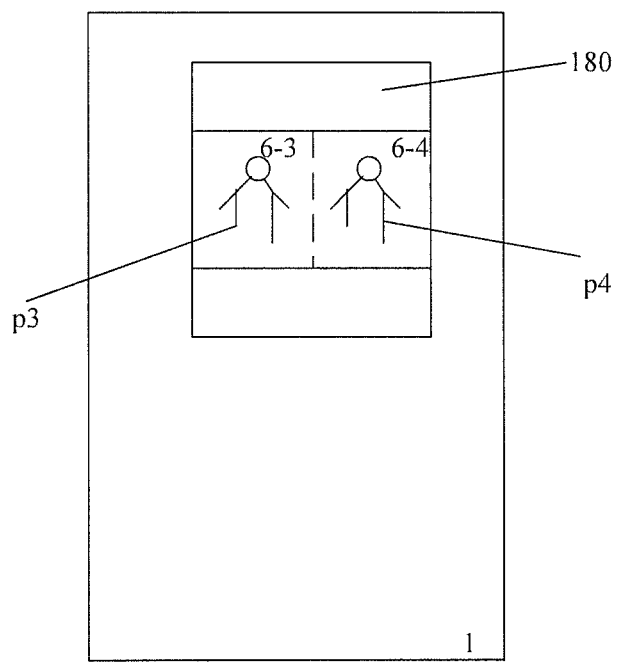
Figure 3:
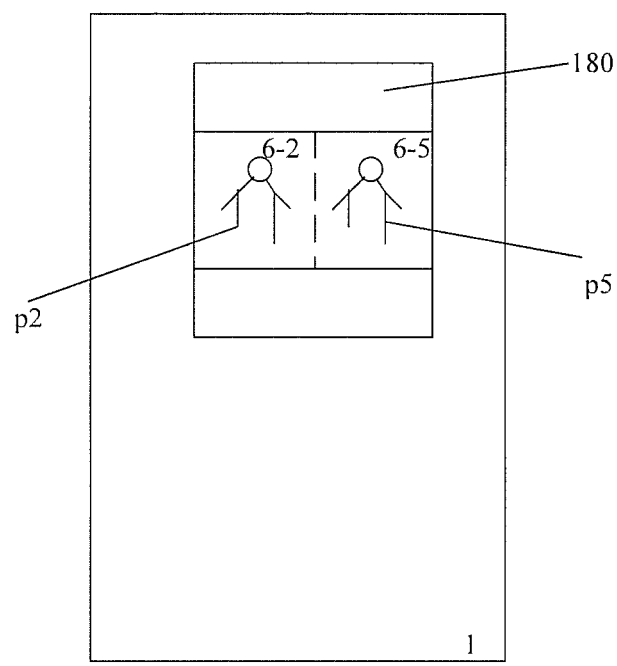

FIG. 3(*a*) shows videos taken by the server integrated six communication terminals according to one embodiment of the present invention. It is assumed that six individuals p1-p6 in the monitored scene are located in the videos 6-1, 6-2, . . . , 6-6 collected by the six communication terminals, respectively. The video portion collected by each communication terminal is referred to as a "window" in the integrated video. If the entire integrated video in FIG. 3(*a*) is displayed on the display of the mobile terminal 1, each window will be too small to see clearly. Therefore, one embodiment of the present invention allows only partial windows to be displayed on the display 180 of the mobile terminal 1. As shown in FIG. 3(*b*), after the tool 11 installed on the mobile terminal 1 is activated, the initial screens displayed on the display 180 of the mobile terminal 1 include only the windows 6-2 and 6-3, namely the windows where the persons p2 and p3 are located.

Since two windows are displayed on the display 180, if the speaker of the mobile terminal outputs all the windows (that is, sounds collected by all the communication terminals), the user who holds the mobile terminal 1 may be confused. Because some sounds come from windows other than the two windows 6-2 and 6-3, the user will not know if they are the sounds of persons in both windows. Therefore, it is necessary at this point for the user to hear only the person associated with the two windows. The transmitting unit 101 now knows which communication terminals (in this example, the second and third communication terminals) correspond to the video displayed on the display of the mobile terminal 1. Therefore, it may be based on the first communication terminal set (i.e. the second and third communication terminals) of the plurality of communication terminals 2 corresponding to the video displayed on the display of the mobile terminal 1, and sends a request for integrated audio of the real-time audio collected by the communication terminal 2 in the first communication terminal set. The receiving unit 102 receives the integrated audio of the real-time audio collected by the communication terminal 2 in the first communication terminal set. So that the speaker of the mobile terminal 1 outputs only the integrated audio of the real-time audio collected by the communication terminals 2 (in this case, the second and third communication terminals) of the first communication terminal set. Instead of the integrated audio from real-time audio collected by all six communication terminals 2.

It should be understood that the block diagram shown in FIG. 1 is for the purpose of illustration only and not as limiting the scope of the invention. In some cases, some units or devices may be added or reduced.

Figure 4:
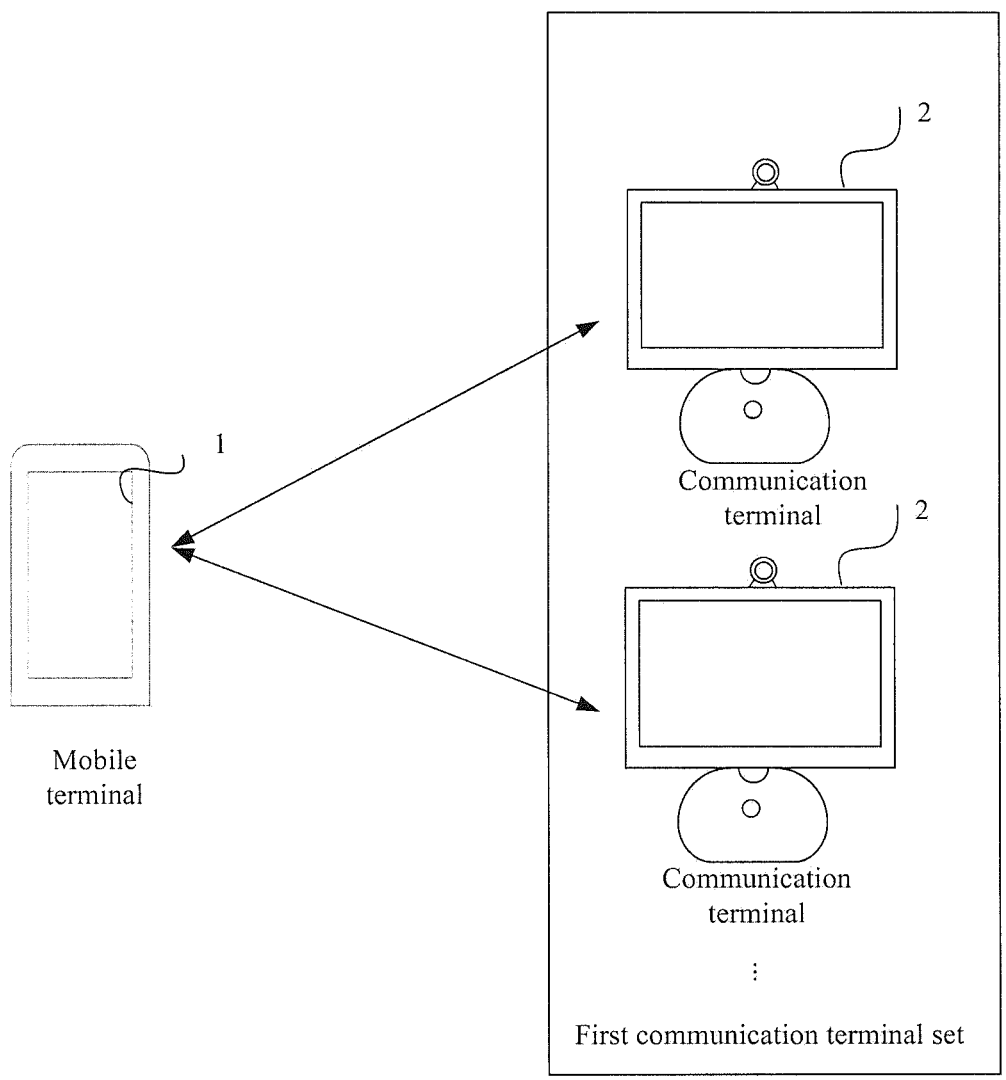
FIG. 4 shows a schematic diagram of establishing a connection between a mobile terminal and a communication terminal in a first communication set according to a preferred embodiment of the present invention.

In the tool 11 according to a preferred embodiment of the present invention, the transmitting unit 101 also initiates a connection request to the communication terminal 2 in the first communication terminal set, and establishes bidirectional communication with the communication terminal 2 in the first communication terminal set in response to the automatic answer of the communication terminal 2 in the first communication terminal set. Refer to FIG. 4, FIG. 4 shows a schematic diagram of establishing a connection between a mobile terminal and a communication terminal in a first communication set according to a preferred embodiment of the present invention. Thus, it is not necessary for the user at the side of the mobile terminal to manually select the object to be initiated the connection request. It is also not necessary to manually initiate a communication connection request after selecting a communication partner. In this way, the user at the mobile terminal does not need to switch the currently playing video page to the page that initiates the connection request to the communication terminal 2. So that the user of the mobile terminal can view the current video page without interruption in the process of establishing communication between the mobile terminal and the communication terminal 2. For example, windows 6-2, 6-3 are displayed in the display shown in FIG. 2*b*. Therefore, a connection request for establishing communication to the second and third communication terminals associated with the windows 6-2 and 6-3 (i.e. the video of the windows 6-2 and 6-3 is initiated) is initiated.

The tool 11 according to a preferred embodiment of the present invention further includes a zooming unit 104 configured to display on the display of the mobile terminal 1 in response to a user's scaling operation of the video displayed on the display of the mobile terminal 1, so that the first communication terminal set corresponding to the video displayed on the display is changed. As shown in FIG. 3(*c*), when the user sees only the video of the window 6-2 and the sound of the person p2 after seeing the video of the windows 6-2 and 6-3 shown in FIG. 3(*b*), enlarges the picture on the display so that only the window p2 is displayed on the display. At this time, the speaker of the mobile terminal outputs only the sound collected by the communication terminal corresponding to the window. Therefore, the user can monitor separately with the p2 Obtain p2 related audio and video without interference from others.

Specifically, the zooming unit 104 may reduce or enlarge a video picture currently displayed by the mobile terminal 1 in response to a user's operation such as two-finger movement or sliding. The first set of communication terminals corresponding to the zoomed video is changed when conditions such as the size of the video picture are located such as within the range of the size of the video picture that is default or user-preset by the tool or the like.

A tool 11 according to a preferred embodiment of the present invention further comprises:

the sliding unit 105 is configured to slide the video displayed on the display of the mobile terminal 1 in response to the user's sliding operation on the video displayed on the display of the mobile terminal 1 so that the video corresponding to the first communication terminal set change. As shown in FIG. 3(*d*), when the user sees the video of the windows 6-2 and 6-3 shown in FIG. 3(*b*) and wants to see who else is on the right of p3, he or she can slide the window to the right. Windows 6-2, 6-3, windows 6-3, 6-4 are displayed on the display. At this moment, the user can obtain the video and audio related to person p3 and p4, and replace the video and audio related to person p2 and p3.

Specifically, the sliding unit 105 may slide a currently displayed video on the display of the mobile terminal 1 in response to a user operation such as dragging, long-slide, slide-only, etc. When a distance such as a slide exceeds a certain threshold and other conditions, the first communication terminal set corresponding to the slid video changes.

Of course, in the above, the user can simultaneously zoom and slide the currently displayed video frame, and can zoom and slide the currently displayed video frame first, and can slide and then zoom the currently displayed video frame first, and then the first communication terminal set changes accordingly.

According to a preferred embodiment of the tool 11 of the present invention, the transmitting unit 101, in response to receiving a selection for a specific person in the specific scene, sends a request for an integrated video and audio of real-time video and audio of the specific person in the real-time video and audio collected by the plurality of communication terminals 2. The receiving unit 102 receives the integrated audio of the real-time audio collected by the communication terminal 2 in the first communication terminal set.

Specifically, the receiving of the selection of a specific person in the specific scene may be performed by, for example, the following manner. For example, the tool 11 recognizes a screen containing a specific person in the currently played video or the received video. The identified specific person is circled in the form of a menu provided to the user for selection. As another example, by responding to a user's clicking on a specific person in a video displayed on the display of the mobile terminal 1, double-clicking or the like, or receiving an audio of a user speaking a specific person's name, or the like. As FIG. 3(*e*) shows, users just want to know what person p2 and p5 are doing, and when they hear what p2 and p5 are saying, they call the names of p2 and p5. The tool 11 recognizes the p2 and p5 by voice recognition, sending a request for integrated video and audio of p2 and p5 to the server. The server identifies the second communication terminal associated with the windows 6-2 and 6-5, and the fifth communication terminal respectively collects the video and audio of p2 and p5. The video and audio collected by the second communication terminal and the fifth communication terminal are respectively integrated and sent to the receiving unit 102 of the tool 11. In this way, the integrated windows p2, p5 shown in FIG. 3(*e*) appear on the display of the mobile terminal, and the audio output by the speaker of the mobile terminal also corresponds to the windows p2, p5. Therefore, the user only to see the video of the person they are interested in, hear the effect of person interested in the audio.

The tool 11 may previously store the pattern and/or the sound frequency of the face of a specific person in the memory in the case of identifying a picture of a specific person included in the currently played video or the received video. There is a matching of the pattern matching of the face of a specific person or/and the presence of the sound frequency of a specific person when the received video audio or the currently played video audio exists. Then a specific person's icon from the video screen and cut out for the user to choose. Of course, the tool may also employ a self-learning method to identify the video or/and audio of a specific person's picture. For example, if a person's picture or/and a person's sound frequency frequently appear in the received video/audio. Then a prompt may be displayed on the display of the mobile terminal 1. The content of the prompt is to identify a specific person, and the user beside the mobile terminal 1 is required to judge and name it. If a user next to the mobile terminal finds a recognition error, enter feedback information on the display to return to the tool. The tool corrects the errors based on historical feedback in the next recognition. In the self-learning manner, the pattern or/and the sound frequency of the face of a specific person may not be stored in the memory in advance.

When the user selects, the transmitting unit 101 responds to receiving a selection for a specific person in the specific scene, and sends a request for an integrated video and audio of the real-time video and audio of the specific person in the real-time video and audio collected by the plurality of communication terminals 2 and receive the corresponding integrated audio by the receiving unit 102. Among them, the communication terminal 2 may identify a specific person based on one or more of face recognition, height recognition, voice recognition.

In the tool 11 according to a preferred embodiment of the present invention, the transmitting unit 101 responds to receiving a selection for a specific person in the specific scene, initiates a connection request to the communication terminal 2 that has acquired the real-time AV audio relating to the specific person, and establishes communication with the communication terminal 2 having acquired the real-time video and audio related to the specific person in response to the automatic answering of the communication terminal 2 having acquired the real-time video and audio relating to the specific person. In this way, the user carrying the mobile terminal 1 not only sees the video of the person he or she desires, but also hears the voice of the desired person. The desired person also saw their own video, heard their own audio, that is, to achieve the two-way communication with the desired person.

Specifically, the transmitting unit 101 may also initiate a connection request to the communication terminal 2 that acquired real-time video and audio relating to the specific person, thereby establishing communication directly between the mobile terminal 1 and the communication terminal 2. So that the mobile terminal 1 can directly communicate with a specific one or more communication terminals 2 in real time to obtain each other's real-time video and audio.

Of course, there may be one or more mobile terminals 1 described above. When there are multiple mobile terminals 1, the mobile terminals 1 may be related to each other or may be independent from each other.

Figure 5:
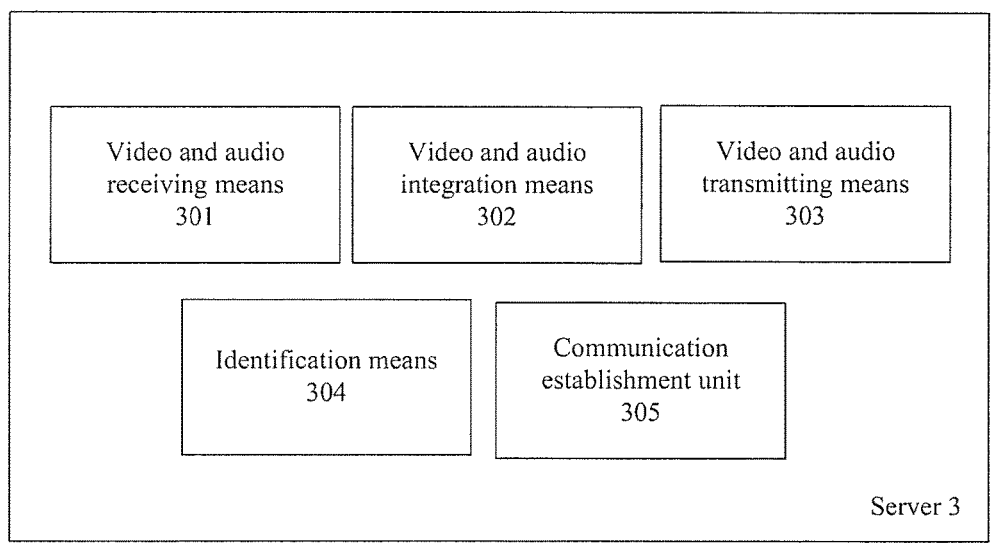
FIG. 5 shows a schematic block diagram of a server that intelligently integrates real-time audio and video according to one embodiment of the present invention.

According to one embodiment of another aspect of the present invention, a server 3 for intelligently integrating real-time audio and video is provided. Please refer to FIG. 5, FIG. 5 shows a schematic block diagram of a server that intelligently integrates real-time audio and video according to an embodiment of the present invention. According to FIG. 5, the server comprises:

A video and audio receiving means 301, configured to receive real-time video and audio from the plurality of communication terminals 2, a request from the mobile terminal 1 for the integrated video of the live video acquired by the plurality of communication terminals, and a request from the mobile terminal 1 for the integrated audio of real-time audio collected by the communication terminal 2 in the first set of communication terminals of the plurality of communication terminals 2;

a video and audio integration means 302, configured to integrate real-time video acquired by the plurality of communication terminals 2 in response to a request from the mobile terminal 1 for an integrated video of the real-time video acquired by the plurality of communication terminals 2, and integrate the real-time audio collected by the communication terminal 2 in the first communication terminal set among the multiple communication terminals 2 in response to the request from the mobile terminal 1 for the integrated audio of real-time audio collected by the communication terminal 2 in the first set of communication terminals of the plurality of communication terminals 2;

a video and audio transmitting means 303, configured to transmit the integrated video or/and the integrated audio to the mobile terminal 1.

wherein the server 3 may include, but not limited to, a single web server, multiple web server sets, or multiple servers. The server 3 receives on the one hand video and audio from a plurality of communication terminals 2 in real time or in time. On the one hand, it is also possible to receive the integrated video or/and audio from the mobile terminal 1 for the real-time video and/or real-time audio collected by the plurality of communication terminals 2. The corresponding video or/and audio are integrated and the integrated video or/and audio is transmitted to the mobile terminal 1 according to the received request for the integration of the real-time video or/and the real-time audio.

According to one embodiment of the present invention, the server 3 further includes a communication establishment unit 305 configured to forward the connection request to the communication terminal 2 in the first communication terminal set in response to receiving a connection request from the mobile terminal 1 to the communication terminal 2 in the first communication terminal set, and establish bidirectional communication between the mobile terminal 1 and the communication terminal 2 in the first communication terminal set in response to the automatic answer of the communication terminal 2 in the first communication terminal set.

Figure 6:
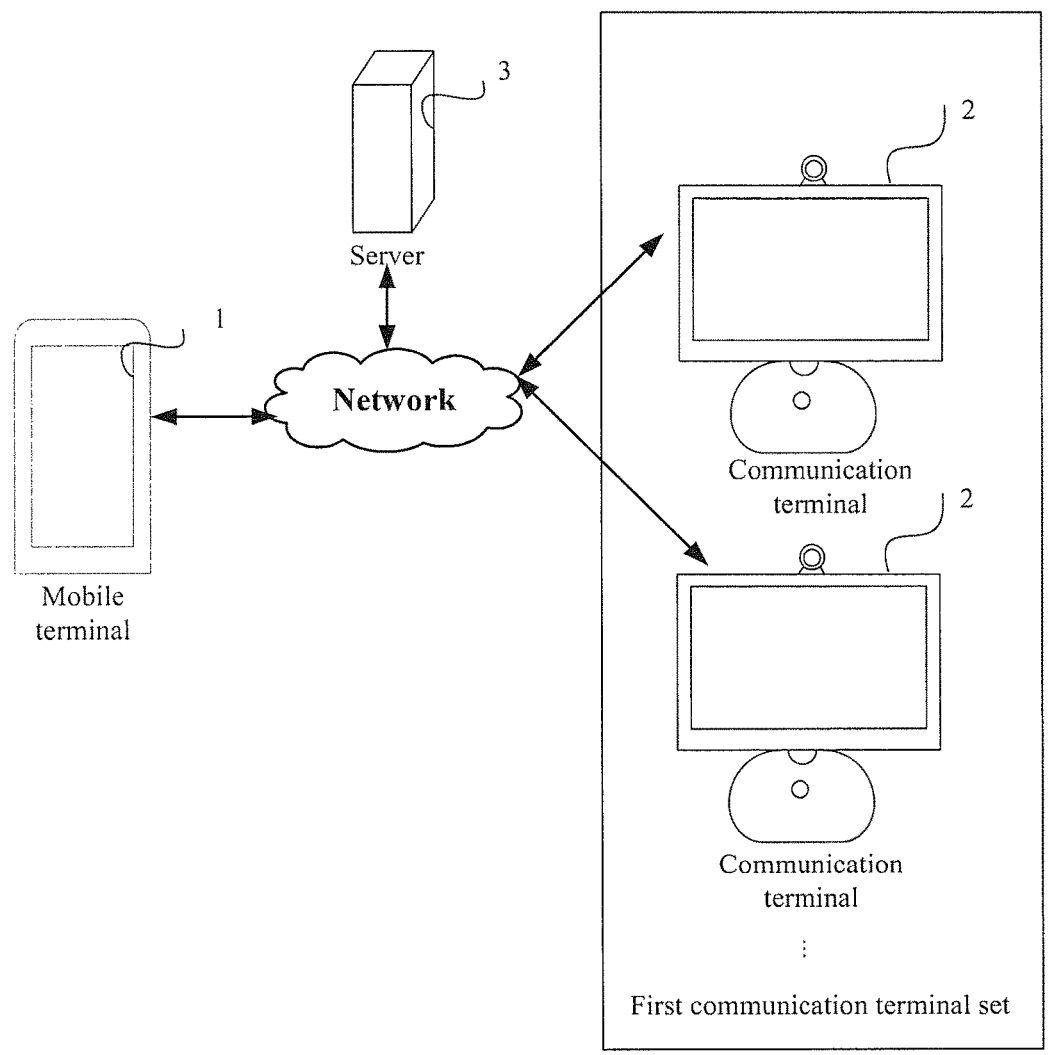
FIG. 6 shows a schematic diagram of establishing a communication between a mobile terminal and a communication terminal based on a server according to a preferred embodiment of the present invention.

In this embodiment, the server may also serve as a communication relay station to establish communication between the mobile terminal 1 and the communication terminal 2. Please refer to FIG. 6, which shows a schematic diagram of establishing a communication between a mobile terminal and a communication terminal based on a server according to a preferred embodiment of the present invention. Specifically, the server 3 receives the connection request of the mobile terminal 1 to the communication terminal in the first communication terminal set or to the specific one or more communication terminals, forwards the connection request to the target communication terminal according to the received connection request, and establishes a bidirectional communication connection with the mobile terminal 1 and the target communication terminal 2 after receiving the automatic answer from the target communication terminal.

Figure 7:
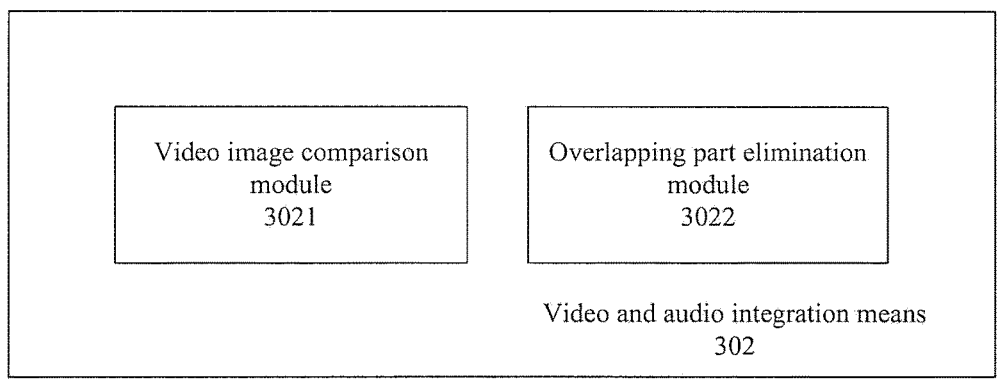
FIG. 7 shows a schematic block diagram of an AV means according to one embodiment of the present invention.

Please refer to FIG. 7, which shows a schematic block diagram of an AV device according to an embodiment of the invention. According to one embodiment of the present invention, the video/audio integration means 302 includes:

a video image comparison module 3021, configured to compare in real time the real-time videos collected by the multiple communication terminals 2 and determine the overlap between the real-time videos collected by the multiple communication terminals 2;

an overlapping part eliminating module 3022, configured to eliminate overlapping parts between the real-time videos collected by the multiple communication terminals 2 so as to integrate the real-time videos collected by the multiple communication terminals 2.

Specifically, since each of the plurality of communication terminals 2 is generally responsible for collecting a portion of audio and video of a specific scene, and the captured video is usually wide-angle shot. In order to capture videos of all viewpoints of a specific scene, audio and video collected by the communication terminals in adjacent or nearby locations usually have overlapping parts. In order to integrate the video captured by multiple communication terminals into a complete, un-integrated video appearing to be captured by a communication terminal with an infinite field of view, it is necessary to eliminate overlapping parts of video and audio captured by multiple communication terminals, and to keep only one video and audio collected for the same scene. In order to send the integrated video to the mobile terminal in real time, the real-time video collected by the multiple communication terminals 2 needs to be compared in real time to determine and eliminate the overlapping video frames.

According to one embodiment of the present invention, the server 3 further includes an identifying means 304, in response to receiving a request from the mobile terminal 1 for integrating video and audio of real-time video and audio of the specific person in the real-time video and audio collected from the plurality of communication terminals 2, identifies real-time video and audio related to the specific person in video and audio acquired by the plurality of communication terminals 2, and The video and audio integration means 302 integrates the real-time video and audio related to the specific person, The video and audio transmitting means 303 sends the integrated real-time video and audio related to the specific person to the mobile terminal 1.

wherein, the server 3 may also recognize the received real-time video and audio related to a specific person in the video and audio collected from the plurality of communication terminals 2 by previously storing the specific person's face mode and/or sound frequency in a memory or self-learning manner, and filter and integrate the identified real-time video and audio from all received video and audio and sends the same to the mobile terminal 1.

According to one embodiment of the present invention, the server 3 further includes an identification means 304, in response to receiving a connection request from the mobile terminal 1 to the communication terminal 2 that acquired real-time video and audio relating to the specific person, identifies real-time video and audio of the specific person in the real-time video and audio collected by the plurality of communication terminals 2, so as to identify the communication terminal 2 that has acquired the real-time video and audio related to the specific person, and The communication establishment unit 305 forwards the connection request to the communication terminal 2 collecting the real-time video and audio relating to the specific person, and in response to the automatic answering of the communication terminal 2 collecting the real-time video and audio concerning the specific person, establishes two-way communication between the mobile terminal 1 and the communication terminal 2 that has acquired the real-time video and audio relating to the specific person.

In this embodiment, the server 3 also acts as a communication relay station and receives a connection request from the mobile terminal 1 to the communication terminal 2 that has collected the real-time video and audio related to the specific person. A bidirectional communication connection is established between the mobile terminal 1 and the communication terminal 2 which relates to the live video and audio of a specific person.

Those skilled in the art will recognize that the present invention may be embodied as a device, an apparatus, a method, or a computer program product. Therefore, the present disclosure may be embodied in the form of complete hardware, complete software, or a combination of hardware and software.

The flowcharts and block diagrams in the figures illustrate the architecture, functionality, and operation of possible implementations of systems, methods, and computer program products in accordance with various embodiments of the present invention. Each block of the flowchart illustrations or block diagrams, can represent a module, a section of a program, or a portion of a program code that contains one or more executable instructions for implementing a prescribed logical function. It should also be noted that in some alternative implementations, the functions noted in the blocks may occur out of the order noted in the figures. For example, two consecutive blocks may in fact be executed substantially in parallel, and sometimes they may be executed in the reverse order, depending on the function involved. It is also to be noted that each block of the block diagrams and/or flowchart illustrations, and combinations of blocks in the block diagrams and/or flowchart illustration, can be implemented by special purpose hardware-based systems that perform the specified functions or operations, or may be implemented by a combination of special purpose hardware and computer instructions.

It will be apparent to those skilled in the art that the invention is not limited to the details of the foregoing exemplary embodiments, but that the present invention may be embodied in other specific forms without departing from the spirit or essential characteristics of the invention. Therefore, no matter the point of view, the embodiments should be regarded as exemplary and not limitative. The scope of the invention is defined by the appended claims rather than the foregoing description and it is intended to cover in the invention all the changes which come within the meaning and the range of equivalency of the claims. Any reference signs in the claims should not be construed as limiting the claim involved.

What is claimed is:

1. A tool mounted on a mobile terminal, comprising:
a transmitting unit configured to send a request for an integrated video of real-time video collected by a plurality of communication terminals in response to a first trigger, wherein the plurality of communication terminals respectively collect real-time video of a part of a specific scene, the real-time videos respectively collected by the plurality of communication terminals integrate to form the real-time video of the specific scene; and
a receiving unit configured to receive integrated video of real-time video collected by the plurality of communication terminals,
wherein based on the integrated video displayed on a display of the mobile terminal corresponding to a first communication terminal set of the plurality of communication terminals, the transmitting unit sends a request for integrated audio of the real-time audio collected by the communication terminal in the first communication terminal set corresponding to the displayed integrated video, the receiving unit receives the integrated audio of the real-time audio collected by the communication terminal in the first communication terminal set corresponding to the displayed integrated video, wherein the video displayed on the display of the mobile terminal is part of an integrated video of real-time video acquired by the plurality of communication terminals; and
wherein the transmitting unit is further configured to initiate a connection request to the communication terminal in the first communication terminal set, and in response to the automatic answering of the communication terminal in the first communication terminal set, a two-way communication is automatically established with the communication terminal in the first communication terminal set.

2. The tool according to claim 1, further comprising: a configuration unit for receiving a configuration of user's integration of video and audio acquired by the plurality of communication terminals.

3. The tool according to claim 1, further comprising:
a zooming unit configured to scale the video displayed on the display of the mobile terminal in response to a user zoom operation on the video displayed on the display of the mobile terminal, such that the first communication terminal set corresponding to the video displayed on the display changes.

4. The tool according to claim 1, further comprising:
a sliding unit configured to respond to a user's slide operation of a video displayed on a display of the mobile terminal, sliding the video displayed on the display of the mobile terminal, so that the first communication terminal set corresponding to the video displayed on the display changes.

5. The tool according to claim 1, wherein the first trigger comprises any one of:
powering on the mobile terminal;
activating the tool when the mobile terminal is powered on;
a specific action on the user interface when the mobile terminal is powered on;
a specific voice received in the power-on state of the mobile terminal; and
the light sensed by the mobile terminal becomes stronger.

6. The tool according to claim 1, wherein the transmitting unit, in response to receiving a selection for a specific person of the specific scenes, sending a request for integrated video and audio of real-time video and audio related to the specific person in real-time video and audio collected by the plurality of communication terminals, the receiving unit receives integrated video and audio related to real-time video and audio of the specific person in the real-time video and audio collected by the plurality of communication terminals.

7. The tool according to claim 1, wherein the transmitting unit initiates a connection request to a communication terminal that has acquired real-time video and audio relating to the specific person in response to receiving a selection for a specific person in the specific scene; and establishing a two-way communication with a communication terminal having acquired real-time video and audio relating to the specific person in response to an automatic reply collected from the communication terminal concerning real-time video and audio of the specific person.

8. The tool according to claim 1, wherein the selection for a specific person of the specific scenes is clicking on a specific person or calling the name of a specific person in the video displayed on the display of the mobile terminal.

* * * * *